United States Patent
Saber et al.

(10) Patent No.: US 11,984,988 B2
(45) Date of Patent: May 14, 2024

(54) SYSTEM AND METHOD FOR PROVIDING DYNAMIC HYBRID AUTOMATIC REPEAT REQUEST (HARQ) CODEBOOK WITH MULTIPLE VALID UNICAST DOWNLINK CONTROL INFORMATION (DCI) PER MONITORING OCCASION INDEX PER SERVING CELL

(71) Applicant: Samsung Electronics Co., Ltd., Gyeonggi-do (KR)

(72) Inventors: Hamid Saber, San Diego, CA (US); Jung Hyun Bae, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/115,307

(22) Filed: Feb. 28, 2023

(65) Prior Publication Data
US 2023/0208561 A1 Jun. 29, 2023

Related U.S. Application Data

(62) Division of application No. 16/887,484, filed on May 29, 2020, now Pat. No. 11,632,196.

(60) Provisional application No. 62/914,220, filed on Oct. 11, 2019, provisional application No. 62/892,792, filed on Aug. 28, 2019, provisional application No.
(Continued)

(51) Int. Cl.
*H04L 1/18* (2023.01)
*H04L 1/1607* (2023.01)
*H04L 1/1812* (2023.01)

(52) U.S. Cl.
CPC .......... *H04L 1/1812* (2013.01); *H04L 1/1671* (2013.01)

(58) Field of Classification Search
CPC ..... H04L 1/1812; H04L 1/1671; H04L 5/001; H04L 1/1861; H04L 1/1896; H04L 5/0053; H04L 5/0055; H04L 5/0091; H04W 72/0446; H04W 72/1284; H04W 72/042; H04W 72/1273; H04W 72/1289; H04J 11/0069
See application file for complete search history.

(56) References Cited

U.S. PATENT DOCUMENTS

| 8,441,996 B2 | 5/2013 | Kim et al. |
| 9,084,238 B2 | 7/2015 | Gao et al. |
| 9,131,482 B2 | 9/2015 | Kwon et al. |

(Continued)

FOREIGN PATENT DOCUMENTS

| EP | 3979729 | 4/2022 | |
| WO | WO 2020/093016 | 5/2020 | |
| WO | WO-2020093016 A1 * | 5/2020 | ........... H04L 1/1819 |

OTHER PUBLICATIONS

European Search Report dated Nov. 19, 2020 issued in counterpart application No. 20184386.9-1213, 9 pages.

*Primary Examiner* — Lan-Huong Truong
(74) *Attorney, Agent, or Firm* — The Farrell Law Firm, P.C.

(57) ABSTRACT

A method and system for determining a physical uplink control channel (PUCCH) resource are provided. The method includes ordering downlink control information (DCI) fields according to an order of serving cells for a monitoring occasion (MO), identifying a plurality of valid DCIs per MO per serving cell and determining the PUCCH resource from a last physical downlink control channel (PDCCH) in a last MO on the serving cell with a largest cell index.

8 Claims, 8 Drawing Sheets

Related U.S. Application Data

62/879,861, filed on Jul. 29, 2019, provisional application No. 62/875,722, filed on Jul. 18, 2019.

(56) References Cited

U.S. PATENT DOCUMENTS

| | | |
|---|---|---|
| 9,491,747 B2 | 11/2016 | Li et al. |
| 9,768,915 B2 | 9/2017 | Kim et al. |
| 9,918,287 B2 | 5/2018 | Kim et al. |
| 10,356,814 B2 | 7/2019 | Hoymann et al. |
| 2013/0010964 A1 | 1/2013 | Fong et al. |
| 2017/0134140 A1 | 5/2017 | Park |
| 2019/0082431 A1* | 3/2019 | Yi .................... H04W 72/0446 |
| 2019/0103947 A1* | 4/2019 | Park .................... H04L 1/1861 |
| 2019/0159240 A1 | 5/2019 | Lohr et al. |
| 2019/0200349 A1* | 6/2019 | Harada ................ H04W 72/21 |
| 2020/0267597 A1 | 8/2020 | Huang |
| 2020/0374045 A1 | 11/2020 | Yin |
| 2021/0184801 A1 | 6/2021 | El Hamss |

* cited by examiner

SYSTEM AND METHOD FOR PROVIDING DYNAMIC HYBRID AUTOMATIC REPEAT REQUEST (HARQ) CODEBOOK WITH MULTIPLE VALID UNICAST DOWNLINK CONTROL INFORMATION (DCI) PER MONITORING OCCASION INDEX PER SERVING CELL

PRIORITY

This application is a Divisional Application of U.S. patent application Ser. No. 16/887,484, filed in the U.S. Patent and Trademark Office (USPTO) on May 29, 2020, which is based on and claims priority under 35 U.S.C. § 119(e) to U.S. Provisional Patent Application Nos. 62/914,220, filed in the USPTO on Oct. 11, 2019, 62/892,792, filed in the USPTO on Aug. 28, 2019, 62/879,861, filed in the USPTO on Jul. 29, 2019, and 62/875,722, filed in the USPTO on Jul. 18, 2019, the entire contents of which are incorporated herein by reference.

FIELD

The present disclosure is generally related to wireless communication systems. In particular, the present disclosure is related to a system and method for determining a physical uplink control channel resource.

BACKGROUND

In the Release 15 (Rel-15) hybrid automatic repeat request (HARQ) acknowledgement (ACK) (HARQ-ACK) codebook, the user equipment (UE) sends the ACK/NACK bits constructed by the codebook in a physical uplink control channel (PUCCH) that the UE transmits in slot n. For PUCCH transmission, the UE uses a PUCCH resource to determine where in time and frequency in slot n the UE should transmit PUCCH. The PUCCH resource is determined by a PUCCH resource indicator (PRI) in the downlink control information (DCI) field present in the physical downlink control channel (PDCCH) scheduling the physical downlink shared channel (PDSCH). In the case of multiple DCI per monitoring occasion (MO), the UE behavior is not clear and no specification is provided on how to choose the PDCCH and the corresponding PRI.

SUMMARY

According to one embodiment, a method for determining a PUCCH resource includes ordering DCI fields according to an order of serving cells for an MO, identifying a plurality of valid DCIs per MO per serving cell and determining the PUCCH resource from a last PDCCH in a last MO on the serving cell with a largest cell index.

According to one embodiment, a system for determining a PUCCH resource includes a memory and a processor configured to order DCI fields according to an order of serving cells for an MO, identify a plurality of valid DCIs per MO per serving cell and determine the PUCCH resource from a last PDCCH in a last MO on the serving cell with a largest cell index.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
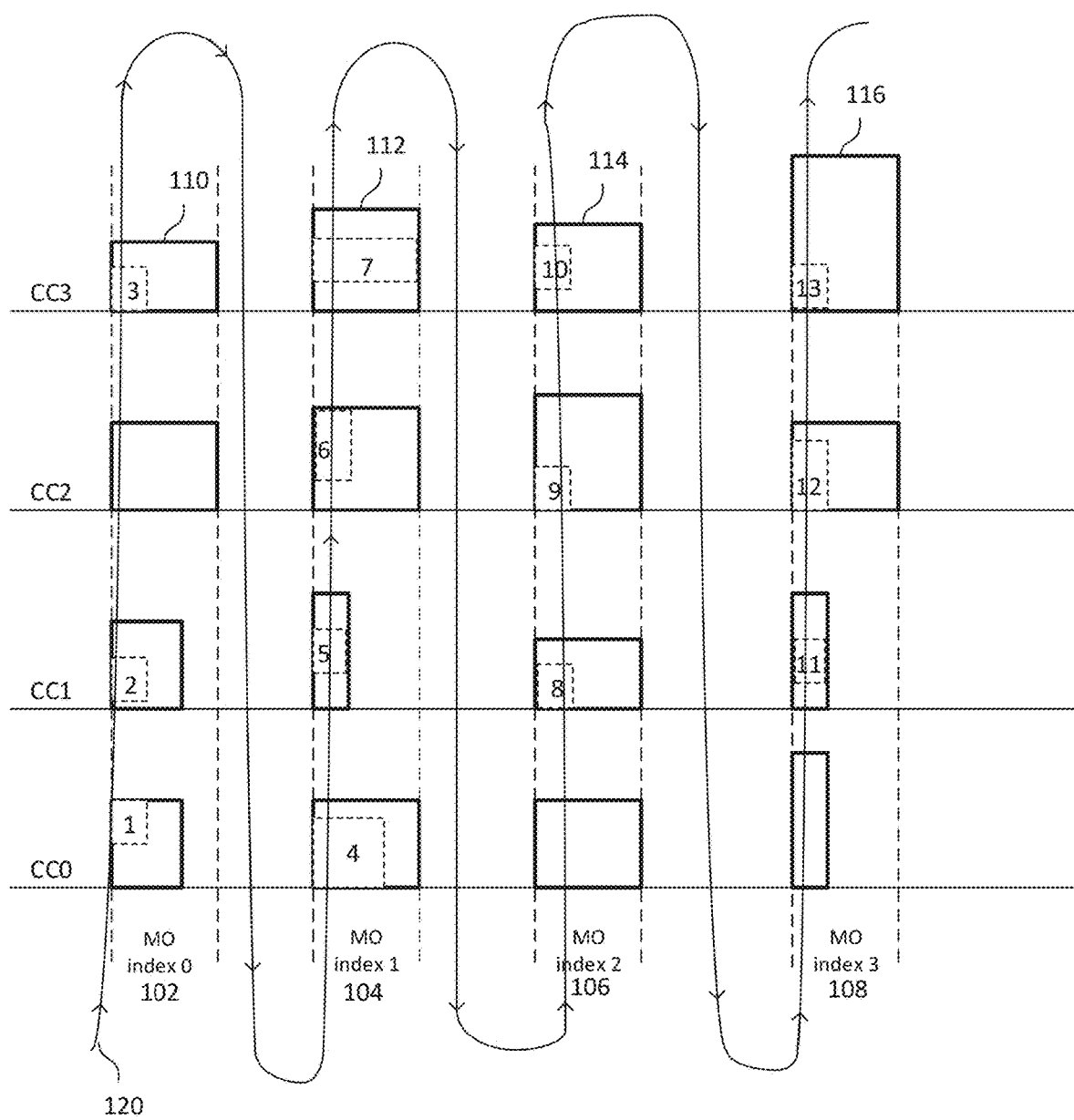
FIG. 1 illustrates a diagram of DCI ordering for PUCCH resource determination and Type-2 HARQ-ACK codebook construction, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

A HARQ-ACK codebook typically generates the HARQ-ACK bits of multiple PDSCHs and multiplexes them in a single PUCCH to transmit in lost n. Since there could be multiple PDCCHs, it may be helpful to clearly indicate to the UE which PDCCH (DCI) it should obtain the PRI from. The current specification in Rel-15 as of the time of filing this application states that PRI is determined based on the "last" DCI among the DCIs whose ACK/NACK is to be sent in the same slot n as specified below from Technical Specification (TS) 38.213:

"For a PUCCH transmission with HARQ-ACK information, a UE determines a PUCCH resource after determining a set of PUCCH resources for $O_{UCI}$ HARQ-ACK information bits, as described in Subclause 9.2.1. The PUCCH resource determination is based on a PUCCH resource indicator field [5, TS 38.212] in a last DCI format 1_0 or DCI format 1_1, or DCI format 1_2 among the DCI formats 1_0 or DCI formats 1_1 or DCI format 1_2 that have a value of a PDSCH-to-HARQ feedback timing indicator field indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes."

Another issue with multiple DCI per MO is that dynamic HARQ-ACK codebook, otherwise known as Type-2 HARQ-ACK codebook, may be modified. Currently, as of the time of filing this application, the pseudo-code in Section 9.1.3.1 of $3^{rd}$ Generation Partnership Project (3GPP) TS 38.213 assumes up to 1 valid DCI per monitoring occasion 'in' per scheduled cell.

The following pseudo code is provided from the 3GPP TS 38.213 clause 9.1.3. in Table 1.

TABLE 1

```
while m < M
    while c < N_cells^DL
        if there is a PDSCH on serving cell c associated
        with PDCCH in PDCCH
        monitoring occasion n, or there is a PDCCH indicating
        SPS PDSCH release
        on serving cell c
            if V_{C-DAI,c,m}^{DL} ≤ V_temp
                j = j + 1
            end if
            .
            .
            .
        end if
    end while
    m=m+1
    end while
```

As can be seen, for a given MO index m and a given serving cell (scheduled cell) c, if a DCI is detected (the meaning of "if there is a PDSCH on serving cell c . . . " in the TS), the corresponding field in the DCI (counter downlink assignment indicator (C-DAI)) is used to determine the HARQ codebook size. As can be seen, if there are two valid DCIs (there are 2 PDSCHs), the code in Table 1 only handles one of them and the other is not processed. This will result in a wrong codebook size.

The present system and method determine the PUCCH resource for HARQ-ACK for multiple DCI per monitoring occasion per serving cell. The present system and method may implement different sorting techniques to sort the detected PDCCHs (DCIs) in the last MO, and then obtaining the PUCCH resource from the PRI field in the "last" DCI. Regarding the Type-2 HARQ-ACK codebook, the present system and method may provide different solutions to sort the PDCCHs within one MO per scheduled cell according to, for example, any of a start symbol of the scheduled PDSCH, a CORESET index, a search space index, or an ordering method based on the values of C-DAI and total DAI (T-DAI).

The present system and method may determine the PUCCH resource for the HARQ-ACK codebook for Multi-DCI per MO per serving cell.

FIG. 1 illustrates a diagram of DCI ordering for PUCCH resource determination and Type-2 HARQ-ACK codebook construction, according to an embodiment. In the example shown in FIG. 1, there are four component carriers (CCs) CC0 through CC3, and four MO indices 102 through 108. To determine the PUCCH resource for HARQ-ACK bits in Rel-15, the DCIs are ordered according to the ascending order of the serving cells for a given MO index first and then ascending order of MO indices. Each square on a CC represents a PDCCH MO. For example, in CC3, square 110 represents an MO of index 0, square 112 represents an MO of index 1, square 114 represents an MO of index 2, and square 116 represents an MO of index 3. Inside each MO on a CC there can be up to 1 DCI for each scheduled cell, (see index c in Table 1), which participates in the same HARQ-ACK codebook. There are 13 DCIs within the 4 MO indices across all CCs. According to Rel-15, the DCIs are ordered first by MO and then (within each MO) by CC (in the depicted example, according to the arrowed curve 120). So the last DCI is the one in MO index 3 and CC3 (square 116). The PRI field in this DCI is used to determine the PUCCH resource for ACK/NACK bits of all DCIs. The ACK/NACK bits are given by the HARQ codebook.

Figure 2:
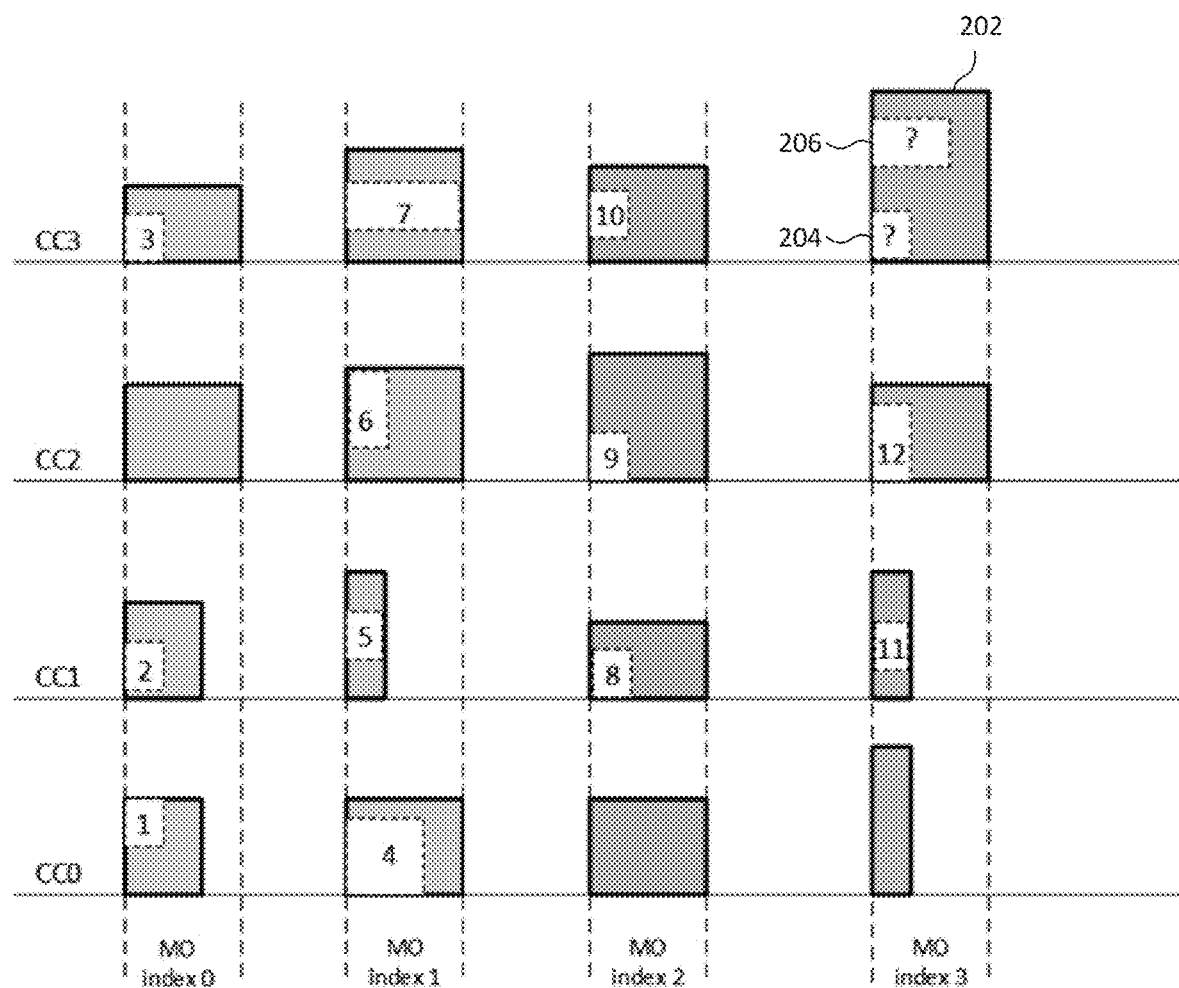
FIG. 2 illustrates a diagram of DCI ordering for PUCCH resource determination, and Type-2 HARQ-ACK codebook construction according to an embodiment.

FIG. 2 illustrates a diagram of DCI ordering for PUCCH resource determination and Type-2 HARQ-ACK codebook construction, according to an embodiment. In the depicted example there is an instance of multi-DCI per MO per serving cell, where there can be more than one valid DCI per MO per serving cell. The ordering of DCIs as given in Rel-15 cannot readily determine which of the DCIs should be used to determine the PRI. For example, square 202 represents the MO index 3 at the CC3, and this includes two PDCCHs.

For the HARQ-ACK codebook, the PUCCH resource is determined from the last PDCCH in the MO with the largest index and on a serving cell with the largest cell index, and the system defines the last PDCCH as described below.

In one example, the last PDCCH is identified as the one in the search space with the CORESET with the largest/smallest CORESET index, which is referred to as the indicating CORESET. With multiple PDCCHs in the indicating CORESET, the UE does not expect indication with different PUCCH resource indicators in those PDCCHs.

In one example, the last PDCCH is identified as the one in the search space with the largest/smallest search space ID regardless of the CORESET index, with the search space referred to as the indicating search space. With multiple PDCCHs in the indicating search space, the UE does not expect indication with different PUCCH resource indicators in those PDCCHs.

In another example, the last PDCCH is identified as the one with the largest/smallest resource block (RB) index (RB start frequency). Referring back to FIG. 2, the square 202 includes a first PDCCH 204 and a second PDCCH 206. The second PDCCH 206 has a larger RB index, and thus may be utilized for PUCCH resource determination.

In another example, the last PDCCH may be identified as the one with the largest/smallest control channel element (CCE) index of the CORESET with largest/smallest CORESET index.

Figure 3:
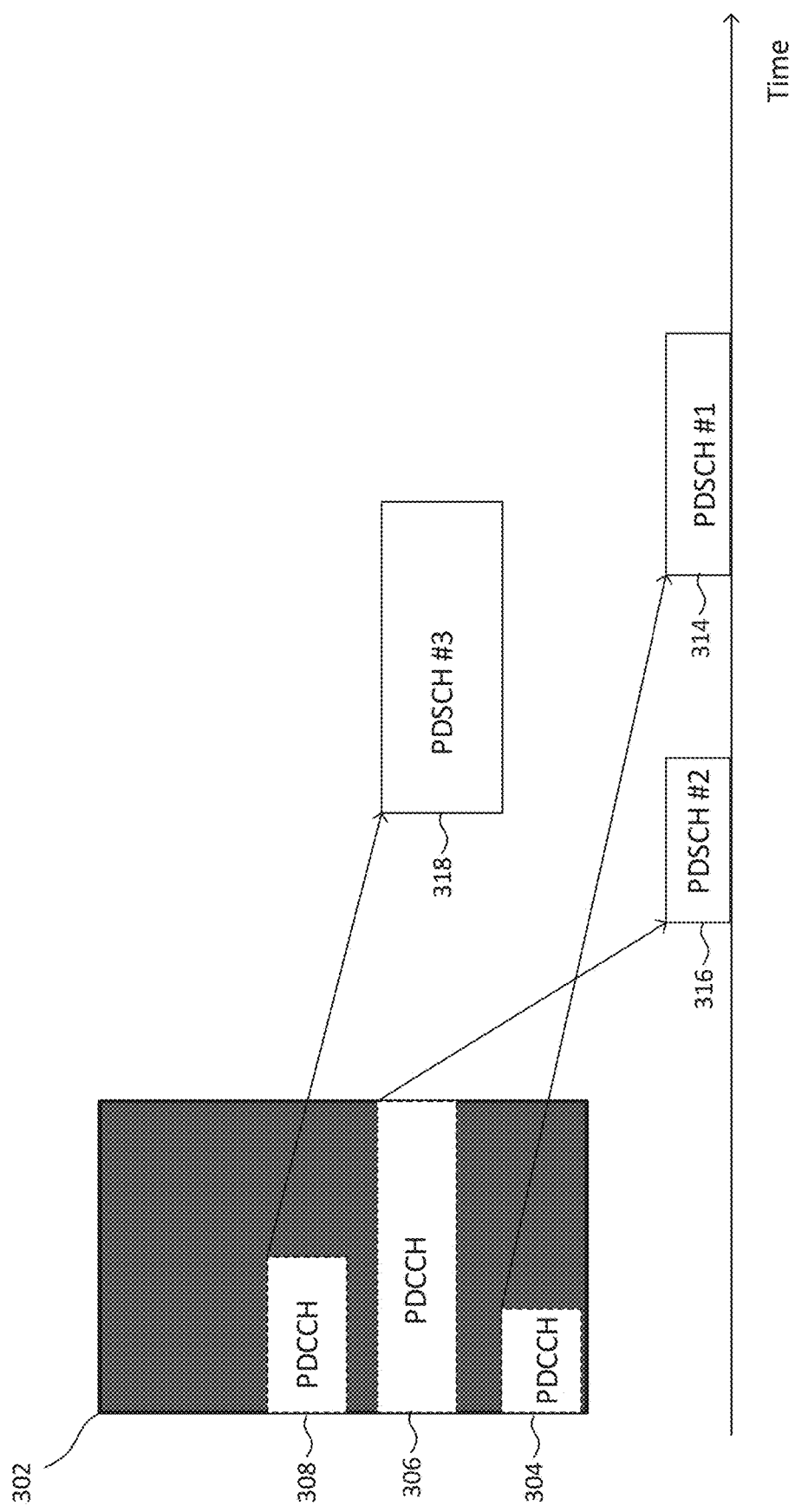
FIG. 3 illustrates a diagram of a serving cell, according to an embodiment.

FIG. 3 illustrates a diagram of a serving cell, according to an embodiment. The serving cell 302 includes a first PDCCH 304 that corresponds with a first PDSCH 314, a second PDCCH 306 that corresponds with a second PDSCH 316, and a third PDCCH 308 that corresponds with a third PDSCH 318. In one example, the last PDCCH may be identified as the one which schedules a PDSCH with the earliest/latest value of a start/end time. When all the PDCCHs are scheduling the earliest/latest value of the start/end time, the UE does not expect the PDCCHs to indicate different values of the PRIs. As shown in FIG. 3, the second PDCCH 306 may be selected and it's indicated PRI may be used to determine the PUCCH resource for the HARQ-ACK, as the PDSCH 316 that corresponds to the PDCCH 306 is first in time.

In a further example, with more than one valid DCI in the largest MO index in the serving cell with the largest index, the UE first orders all the value DCIs according to an ordering rule and the uses the DCI which comes last (or first) in the ordered list to determine the PUCCH resource for ACK/NACK transmission. The PDCCH order rule may be based on the values of the C-DAI. The system may employ a machine learning (ML) based ordering rule according to the values of the C-DAI of the valid DCIs. The UE orders the DCIs in the last MO based on the largest C-DAI in the previous MO and all the valid DCIs in the last MO.

In another example, the last PDCCH is identified as to be any of the PDCCHs in the MO with the largest index on the serving cell with the largest serving cell index. All the PDCCHs in the MO with the largest index and on the serving cell with the largest serving cell index indicate the same PDCCH resource.

The Rel-15 Type-2 HARQ-ACK codebook only works for one valid DCI per MO index per serving (scheduled) cell for one HARQ-ACK payload. The present system and method provide the type-2 HARQ-ACK codebook that works with multi-DCI per MO per serving cells where all the DCIs indicate one slot for HARQ-ACK transmission.

With $L_{max}$ being the maximum number of valid DCIs per serving cell, the Type-2 HARQ codebook pseudo code can be modified as shown in Table 2.

TABLE 2

```
l = 0;
m = 0;
While m < M
    While c < N_cells^DL
        If there are L > 0 distinct PDCCHs in PDCCH
        monitoring occasion m which
        either schedule a PDSCH on serving cell c or indicate
        SPS PDSCH release, denote the
        PDCCHs as PDCCH_0, PDCCH_1, ...,PDCCH_{L-1} which
        are ordered according to the
        examples described herein.
            l = 0
            While l < L
                l = l + 1
            End while
        End if
        c=c+1
    End while
    m=m+1
End while
```

The UE is configured with a maximum number of $L_{max} = 2^l$ valid DCI per MO per scheduled cell. The UE can be scheduled with $L \leq L_{max}$ valid DCIs per MO per the scheduled cell such that the UE transmits the HARQ-ACK bits of the corresponding L PDSCHs in one PUCCH. The bit-width of C-DAI field in DCI is set to $\log_2 L_{max} = l$.

In a first example, the system utilizes the start RB index based C-DAI ordering within the MO per serving cell. The system utilizes the starting RB index of the PDCCH candidate (the candidate with lower starting RB index has lower C-DAI value). This method puts some restriction on the network in terms of C-DAI ordering, and it may also put some burden on C-DAI processing at the UE if the UE's blind decoding (BD) order does not follow C-DAI order. Equivalently or similarly, PDCCHs are numbered from 1 to L in ascending order of starting RB index. For example, as shown in FIG. 2, PDCCH 204 and 206 are numbered such that a PDCCH starting at a lower RB index comes before the one starting at a higher RB index.

In a second example, the PDCCHs are ordered according to the start/end time of their corresponding PDSCHs. With two PDSCHs having the same start/end time, the PDCCHs are ordered according to their CORESET ID. If the CORESET IDs are the same, they are ordered according to the search space ID. For example, referring to FIG. 3, if the start time of the PDSCH is chosen to order the PDCCHs, the PDCCH order is PDCCH 306, PDCCH 308 and PDCCH 304.

The above two examples are reliable as the Rel-15 codebook where a maximum of 1 DCI per MO exists. The first and second examples above may require a scheduling restriction on gNB, which is a value of C-DAI in the detected DCI showing the accumulated number of present DCIs up to the current PDCCH candidate. The scheduling PDCCH orders or C-DAI orders are known to both gNB and UE.

In a third example, there is no explicit C-DAI ordering within the MO per serving cell. Even without explicit C-DAI ordering, the system can consider the likelihood based C-DAI ordering in the pseudo code described below for $L_{max}=4$. In this case, the L found PDCCHs, and hence the L found C-DAI values, are ordered based on a likelihood measure.

For 4 DCIs decoded, the four cyclic shifts of (1,2,3,4) (1234, 4123, 3412, and 2341) are valid sequences, and the C-DAI ordering can be determined by looking at the latest C-DAI decoded (adjusted by total DAI) in previous MO. If the value of C-DAI before processing this MO was 4, then 1234 is chosen, if 2 then 3412 is chosen, if 3 then 4123 is chosen and if 4 then 1234 is chosen.

For 3 DCIs decoded, 123, 231, 312, 124, 241, 412, 134, 341, 413, 234, 342 and 423 are valid sequences. For each case, an ML decision can be made on the latest C-DAI decoded in previous MO. For example, with {1, 3, 4}, which has 134, 341, 413 as valid sequences, if the previous C-DAI is 1, 341 is most likely. Assuming 341 gives 1341 which indicates one miss between 1 and 3 (C-DAI sequence 12341). Assuming 134 gives 1234, 1234 which indicates 4 DCI misses. Assuming 413 gives 1234123 which indicates 3 DCI misses. The number of decoded DCI's in the previous MO can also be used.

For 2 DCIs decoded, 12, 21, 13, 31, 14, 41, 23, 32, 24, 42, 34 and 43 are possible orders. For each case, an ML decision can be made based on the latest C-DAI decoded in previous MO. For example, with {1, 4} as the found DCIs, which has 14 or 41 as valid sequences, if the previous C-DAI is 3, then 41 is most likely. Assuming 41 gives 341 which indicates zero misses while assuming 14 gives 341234, which indicates 3 misses. Thus, 41 is more likely, so {4, 1} is ordered as 41. The corresponding two PDCCHs are found based on this ordering.

For 1 DCI decoded, no ordering is required.

The implicit ordering of the PDCCHs above can be implemented in a practical way by the UE using cyclic shift operators. With the cyclic shift operators, various ordering methods can be applied.

In one example, the UE detects the L DCIs (PDCCHs) with C-DAI values of $(c_0, c_1, \ldots, c_{L-1})$. The UE orders the C-DAI values by sorting the detected C-DAI values $(c_0, c_1, \ldots, c_{L-1})$ in ascending order to obtain $(c_0', c_1', \ldots, c_{L-1}')$, $c_0' < c_1' < \ldots < c_{L-1}'$ and applying a cyclic shift in the amount of $N_{CS}$ to obtain the ordered set $(c_0'', c_1'', \ldots, c_{L-1}'')$, where $c_i'' = c_{(i+N_{CS}) \mod L}'$. The UE determines the value of cyclic shift based on the current value of C-DAI, $c_{curr}$, before entering the added "while 1<L" loop and $(c_0', c_1', \ldots, c_{L-1}')$, as follows: If none of the C-DAI values $c_i'$, $0 \leq i < L$ are larger than $c_{curr}$, then the value of cyclic shift $N_{CS}=0$. If there are multiple C-DAI values which are larger than $c_{curr}$, the UE selects a C-DAI value $c_k'$ among the multiple values such that $c_k' - c_{curr}$ is minimized. The value of $N_{CS}$ is then chosen to be k.

The ordered PDCCHs are then found as the first PDCCH is the PDCCH with C-DAI value of $c_0''$. The second PDCCH is the PDCCH with C-DAI value of $c_1''$ and so on. The pseudo-code in Table 3 gives an algorithmic method to obtain the ordered PDCCHs from the detected PDCCHs and the current PDCCH with the value of C-DAI=$c_{curr}$.

TABLE 3

Figure 4:
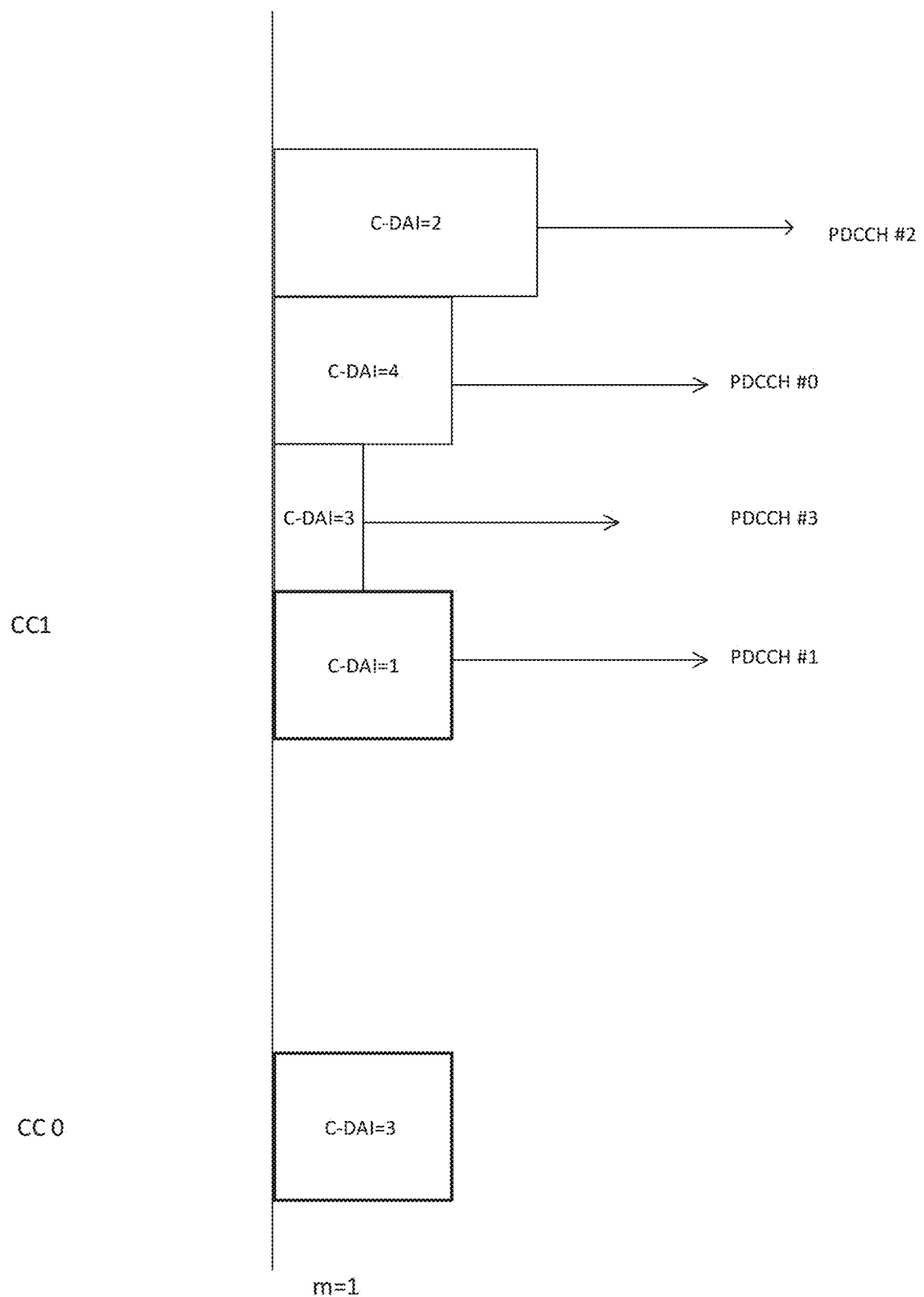
FIG. 4 illustrates a diagram of multiple DCI per MO per serving cell, according to an embodiment.
Figure 5:
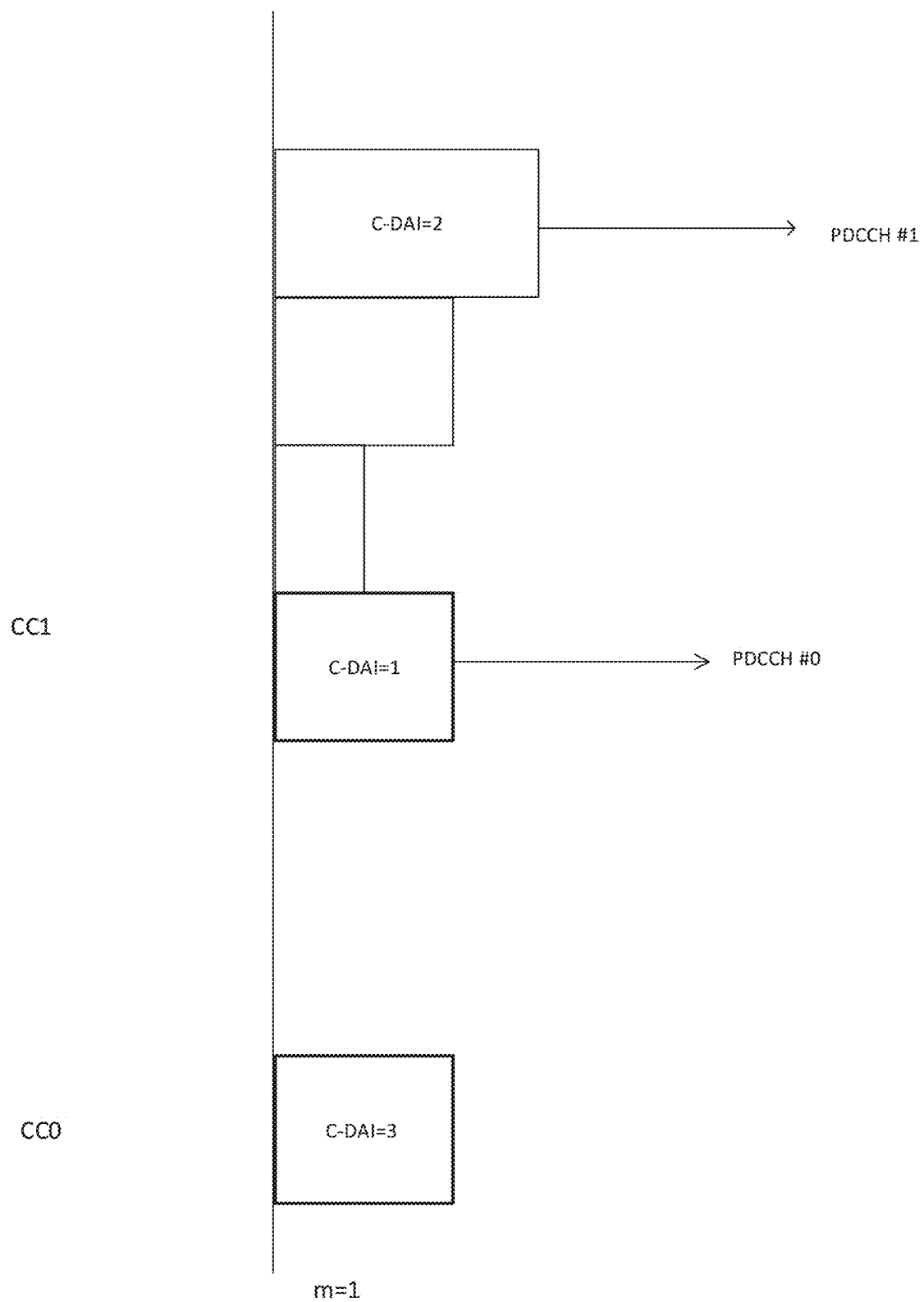
FIG. 5 illustrates a diagram of multiple DCI per MO per serving cell, according to an embodiment.

Input: 1) Current PDCCH with a value of C-DAI=$c_{curr}$ in the DCI and 2) the detected PDCCHs by UE detected_PDCCH #0, detected_PDCCH #1,..., detected_PDCCH #(L − 1) in MO index m and serving cell index c
Output: The ordered PDCCHs, PDCCH$_0$, PDCCH$_1$, ..., PDCCH$_{L-1}$
Step 0. Make an L -tuple $(c_0, c_1, \ldots, c_{L-1})$ where $c_i$ is the value of C-DAI given by detected_PDCCH #i
Step 1. Make an L-tuple $(c'_0, c'_1, \ldots, c'_{L-1})$ from $(c_0, c_1, \ldots, c_{L-1})$ by sorting the C-DAI values in ascending order, e.g., such that $c'_0 < c'_1 < \ldots < c'_{L-1}$
Step 2. Find cyclic shift value $N_{CS}$:
If none of the C-DAI values $c'_i$, $0 \leq i < L$ are larger than $c_{curr}$
    $N_{CS} = 0$
Else
    $N_{CS} = \text{argmin}_{k | c'_k > c_{curr}} c'_k$
End if
Step 3. Make L-tuple $(c''_0, c''_1, \ldots, c''_{L-1})$, by cyclic shifting of $(c'_0, c'_1, \ldots, c'_{L-1})$ to the left $N_{CS}$ times.
    $c''_i = c'_{(i+N_{CS}) \mod L}$, for $i = 0, \ldots, L - 1$
Step 4. Find the ordered PDCCHs, e.g., PDCCH$_i$, $i = 0, \ldots, L - 1$ from the detected PDCCHs as follows
Set i = 0
While i < L
    Step 4-0. Find k, $0 \leq k < L$ such that $c''_i = c_k$
    Step 4-1. Set PDCCH$_i$ as detected_PDCCH #k: PDCCH$_i$ ← detected_PDCCH #k
End While FIG. 4 illustrates a diagram of multiple DCI per MO per serving cell, according to an embodiment. Four DCIs are detected on CC1 and one DCI is detected on CC0. Assuming $L_{max}$=4 and that the UE detects L=4 DCIs with corresponding 4 C-DAIs in the MO index m=1 on serving cell CC1, then the UE detects the DCIs in the order of C-DAI=($c_0$, $c_1$, $c_2$, $c_3$)=(1, 4, 3, 2). If the value of C-DAI when entering the while loop is 3 from CC0, then ($c_0$, $c_1$, $c_2$, $c_3$) is ordered to obtain ($c_0'$, $c_1'$, $c_2'$, $c_3'$)=(1,2,3,4). In order to choose the value of cyclic shift the smallest value $c_k'$ which is also larger than current C-DAI, $c_{curr}$=3 is chosen to be $c_k'$=4, so $N_{CS}$=k=3. Applying the cyclic shift will give ($c_0''$, $c_1''$, $c_2''$, $c_3''$) (4, 1, 2, 3). This ordered set of C-DAI is then used to enter the added "while" loop. In other words, although the UE has detected the C-DAIs in the order of ($c_0$, $c_1$, $c_2$, $c_3$)=(1, 4, 3, 2), it will run the pseudo-code in the order of ($c_0''$, $c_1''$, $c_2''$, $c_3''$)=(4, 1, 2, 3). In this way, UE has inferred the intended PDCCH order by gNB FIG. 5 illustrates a diagram of multiple DCI per MO per serving cell, according to an embodiment. Two DCIs are detected on CC1 and one DCI is detected on CC0. Assuming $L_{max}$=4, only L=2 DCIs are detected in MO m=1 on serving cell CC1. Assuming the UE has detected the DCIs in the order of C-DAI=($c_0$, $c_1$)=(2,1), the value of C-DAI when entering the while loop is 3 from CC1. ($c_0$, $c_1$) is ordered to obtain ($c_0'$, $c_1'$)=(1,2). Since both of $c_0'$ and $c_1'$ are smaller than current C-DAI, $c_{curr}$=3 and the value of cyclic shift is $N_{CS}$=0. Applying the cyclic shift will give ($c_0''$, $c_1''$)=(1,2). This ordered set of C-DAI is used to enter the new "while" loop. In other words, although UE has detected the C-DAIs in the order of ($c_0$, $c_1$)=(2,1), it will run the pseudo-code in the order of ($c_0''$, $c_1''$)=(1,2). In this way, it has inferred the intended PDCCH order by gNB. In this case, the C-DAI sequence 3→1→2 indicates one missing DCI with C-DAI=4 between 3 and 1. The UE considers the C-DAI sequence transmitted by gNB to be 3→4→1→2.

Figure 6:
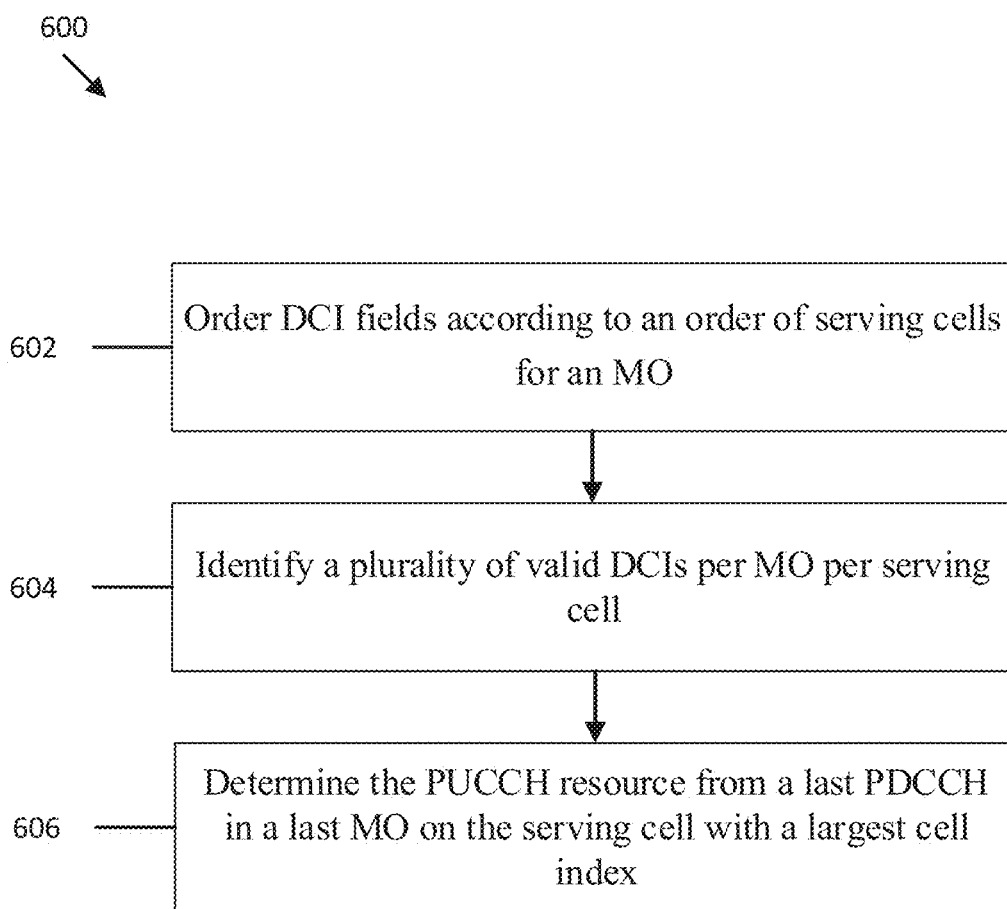
FIG. 6 illustrates a flowchart of steps in a method for determining a PUCCH resource, according to an embodiment.

FIG. 6 illustrates a flowchart 600 of steps in a method for determining a PUCCH resource, according to an embodiment. At 602, the system orders DCI fields according to an order of serving cells for an MO. At 604, the system identifies a plurality of valid DCIs per MO per serving cell. At 606, the system determines the PUCCH resource from a last PDCCH in the last MO on the serving cell with largest cell index.

The system may determine the PUCCH resource from the last PDCCH in the MO by identifying a PDCCH in a search space with a largest or smallest search space ID. The system may determine the PUCCH resource from the last PDCCH in the MO by identifying a PDCCH with a largest or smallest RB index. The system may determine the PUCCH resource from the last PDCCH in the MO by identifying a PDCCH with a largest or smallest control channel element (CCE) index corresponding to a search space with smallest/largest CORESET index. The system may determine the PUCCH resource from the last PDCCH in the MO by identifying a PDCCH which schedules a PDSCH with an earliest or latest start time. The system may determine the PUCCH resource from the last PDCCH in the MO by identifying a PDCCH which schedules a PDSCH with an earliest or latest end time. The system may determine the PUCCH resource from the last PDCCH in the MO by identifying a PDCCH according to an ordering rule based on values of a C-DAI. The system may determine the PUCCH resource from the last PDCCH in the MO by identifying a PDCCH in the MO with a largest index on the serving cell.

Figure 7:
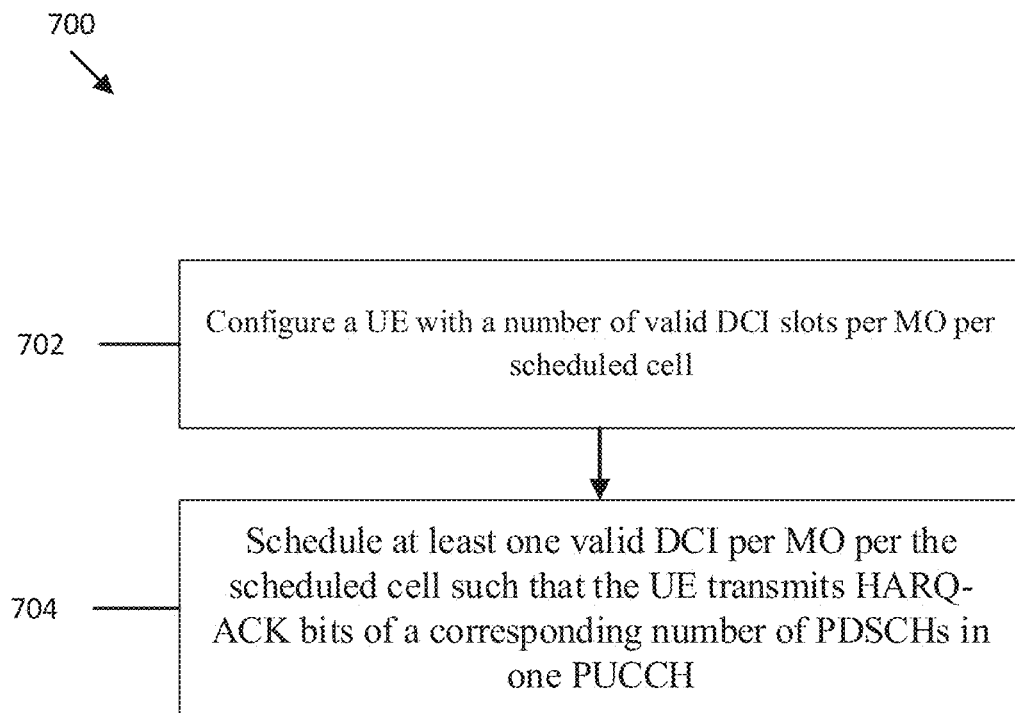
FIG. 7 illustrates a flowchart of steps in a method for providing a type-2 HARQ codebook for multiple DCI, according to an embodiment.

FIG. 7 illustrates a flowchart 700 of steps in a method for providing a type-2 HARQ codebook for multiple DCI, according to an embodiment. At 702, the system configures a UE with a number of valid DCI slots per MO per scheduled cell. The system may configure the UE with the maximum number of valid DCI slots per MO per scheduled cell. The maximum number of valid DCIs per MO per scheduled cell can be determined based on the UE reporting it as a capability to the network and/or the network configuring the number to the UE via radio resource control (RRC). At 704, the system schedules at least one valid DCI per MO per the scheduled cell such that the UE transmits HARQ-ACK bits of a corresponding number of PDSCHs in one PUCCH.

The system may utilize a start RB index based on C-DAI ordering within the MO per scheduled cell. The system may order PDCCHs according to a start time or an end time of a corresponding PDSCH. The system may order found C-DAI values based on a likelihood measured determined from a cyclic shift value.

Figure 8:
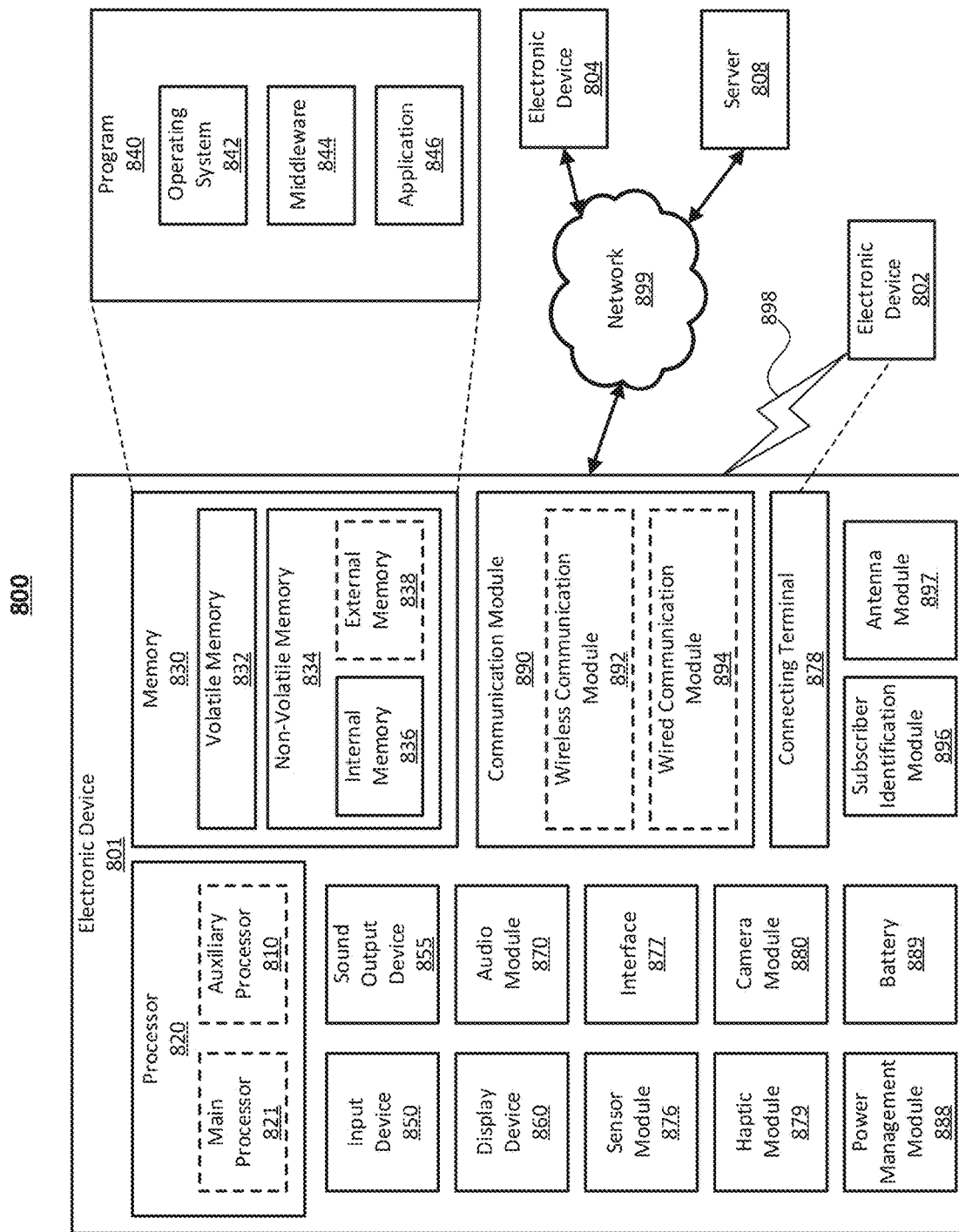
FIG. 8 illustrates a block diagram of an electronic device in a network environment, according to one embodiment.

FIG. 8 illustrates a block diagram of an electronic device 801 in a network environment 800, according to one embodiment. Referring to FIG. 8, the electronic device 801 (e.g., a base station with a transceiver) in the network environment 800 may communicate with an electronic device 802 via a first network 898 (e.g., a short-range wireless communication network), or an electronic device 804 or a server 808 via a second network 899 (e.g., a long-range wireless communication network). The electronic device 801 may communicate with the electronic device 804 via the server 808. The electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In one embodiment, at least one (e.g., the display device 860 or the camera module 880) of the components may be omitted from the electronic device 801, or one or more other components may be added to the electronic device 801. In one embodiment, some of the components may be implemented as a single integrated circuit (IC). For example, the sensor module 876 (e.g., a fingerprint sensor, an iris sensor, or an illuminance sensor) may be embedded in the display device 860 (e.g., a display).

The processor 820 may execute, for example, software (e.g., a program 840) to control at least one other component (e.g., a hardware or a software component) of the electronic device 801 coupled with the processor 820, and may perform various data processing or computations. As at least part of the data processing or computations, the processor 820 may load a command or data received from another component (e.g., the sensor module 876 or the communication module 890) in volatile memory 832, process the command or the data stored in the volatile memory 832, and store resulting data in non-volatile memory 834. The processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or execute a particular function. The auxiliary processor 823 may be implemented as being separate from, or a part of, the main processor 821.

The auxiliary processor 823 may control at least some of the functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to one embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to one embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to one embodiment, the audio module 870 may obtain the sound via the input device 850, or output the sound via the sound output device 855 or a headphone of an external electronic device 802 directly (e.g., wired) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. The sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device 802 directly (e.g., wired) or wirelessly. According to one embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device 802. According to one embodiment, the connecting terminal 878 may include, for example, an HDMI connector, a USB connector, an SD card connector, or an audio connector (e.g., a headphone connector).

The haptic module 879 may convert an electrical signal into a mechanical stimulus (e.g., a vibration or a movement) or an electrical stimulus which may be recognized by a user via tactile sensation or kinesthetic sensation. According to one embodiment, the haptic module 879 may include, for example, a motor, a piezoelectric element, or an electrical stimulator.

The camera module 880 may capture a still image or moving images. According to one embodiment, the camera module 880 may include one or more lenses, image sensors, image signal processors, or flashes.

The power management module 888 may manage power supplied to the electronic device 801. The power management module 888 may be implemented as at least part of, for example, a power management integrated circuit (PMIC).

The battery 889 may supply power to at least one component of the electronic device 801. According to one embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the AP) and supports a direct (e.g., wired) communication or a wireless communication. According to one embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or a standard of the Infrared Data Association (IrDA)) or the second network 899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to one embodiment, the antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. All or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

One embodiment may be implemented as software (e.g., the program 840) including one or more instructions that are stored in a storage medium (e.g., internal memory 836 or external memory 838) that is readable by a machine (e.g., the electronic device 801). For example, a processor of the electronic device 801 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for determining a physical uplink control channel (PUCCH) resource, comprising:
    ordering downlink control information (DCI) fields according to an order of a plurality of serving cells for each of a plurality of monitoring occasions (MOs);
    identifying a plurality of valid DCIs per MO per serving cell; and
    determining the PUCCH resource from a physical downlink control channel (PDCCH) in a MO with a largest MO index, from among the plurality of MOs, on a serving cell with a largest cell index, from among the plurality of serving cells, based on a corresponding physical downlink shared channel (PDSCH) start or end time, or a counter downlink assignment indicator (C-DAI).

2. The method of claim 1, wherein determining the PUCCH resource comprises identifying the PDCCH which schedules the corresponding PDSCH with an earliest or latest start time.

3. The method of claim 1, wherein determining the PUCCH resource comprises identifying the PDCCH which schedules the corresponding PDSCH with an earliest or latest end time.

4. The method of claim 1, wherein determining the PUCCH resource comprises identifying the PDCCH according to an ordering rule based on values of the C-DAI.

5. A system for determining a physical uplink control channel (PUCCH) resource, comprising:
    a memory; and
    a processor configured to:
        order downlink control information (DCI) fields according to an order of a plurality of serving cells for each of a plurality of monitoring occasions (MOs);

identify a plurality of valid DCI per MO per serving cell; and determine the PUCCH resource from a physical downlink control channel (PDCCH) in an MO with a largest MO index, from among the plurality of MOs, on a serving cell with a largest cell index, among the plurality of serving cells, based on a corresponding physical downlink shared channel (PDSCH) start or end time, or a counter downlink assignment indicator (C-DAI).

6. The system of claim 5, wherein the processor is further configured to determine the PUCCH resource by identifying the PDCCH which schedules the corresponding PDSCH with an earliest or latest start time.

7. The system of claim 5, wherein the processor is further configured to determine the PUCCH resource by identifying the PDCCH which schedules the corresponding PDSCH with an earliest or latest end time.

8. The system of claim 5, wherein the processor is further configured to determine the PUCCH resource by identifying the PDCCH according to an ordering rule based on values of the C-DAI.

\* \* \* \* \*